United States Patent [19]

Lancaster et al.

[11] 4,413,801
[45] Nov. 8, 1983

[54] LADDER RACK

[76] Inventors: Paul B. Lancaster, 8451 Elliot Ave. South, Bloomington, Minn. 55420; Gordon A. Huisentruit, 3120 Pilot Knob Rd., Eagan, Minn. 55122

[21] Appl. No.: 243,456

[22] Filed: Mar. 13, 1981

[51] Int. Cl.³ ............................................... A47F 5/00
[52] U.S. Cl. ........................... 248/316 A; 224/42.03 R; 224/42.45 R
[58] Field of Search ................. 224/42.45 R, 42.03 R, 224/273; 248/316 R, 316 A, 316 B, 316 C, 316 D, 316 E, 316 F

[56] References Cited

U.S. PATENT DOCUMENTS

| 1,826,893 | 10/1931 | Larsen | 224/42.45 R X |
| 2,080,527 | 5/1937 | Bixel | 248/316 B |
| 2,302,300 | 11/1942 | Davies | 224/273 X |
| 2,368,991 | 2/1945 | Kopp | 248/316 A |
| 2,646,909 | 7/1953 | Barden | 224/42.03 R |
| 2,840,288 | 6/1958 | Broddon | 224/42.45 R |
| 3,433,446 | 3/1969 | Meder | 248/316 A |
| 3,580,441 | 5/1971 | Zercher | 224/42.45 R X |

FOREIGN PATENT DOCUMENTS

| 736565 | 11/1932 | France | 248/316 A |
| 915630 | 11/1946 | France | 224/42.45 R |
| 247693 | 2/1926 | United Kingdom | 248/316 A |

Primary Examiner—Ramon S. Britts
Assistant Examiner—Sarah A. Lechok

[57] ABSTRACT

This invention relates to ladder racks, i.e. ladder supports, which are designed to be mounted on a substrate or support for the purpose of carrying or storing a ladder or the like.

8 Claims, 9 Drawing Figures

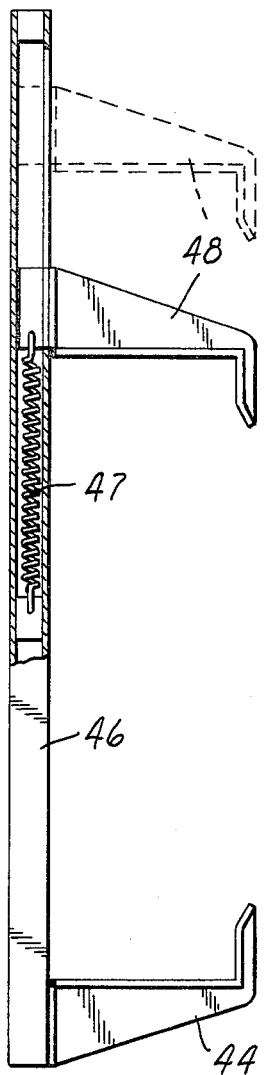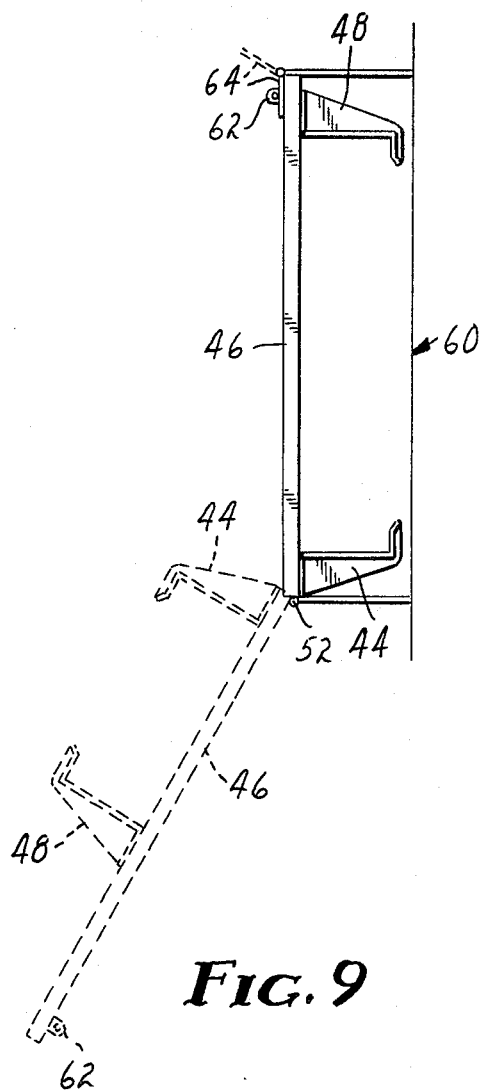
FIG. 8
FIG. 9

LADDER RACK

Technical Field

This invention relates to ladder racks, i.e. ladder supports, which are designed to be mounted on a substrate or support for the purpose of carrying or storing a ladder or the like.

Background Art

Various types of racks and supports carrying objects on vehicles have been known and used for many years. For example, temporary, removable supports or racks are described in U.S. Pat. Nos. 1,919,271; 2,116,443; 2,302,300; and 3,580,441. Such devices are said to be useful for carrying such items as pipe, lumber, ladders, etc. A license tag holder for a vehicle is described in U.S. Pat. No. 1,338,422. More permanent supports or racks are described in U.S. Pat. Nos. 1,826,893 (for carrying ladders); 2,499,654 (for carrying lumber and logs on a tractor); 2,646,909 (for carrying pipe and lumber); 2,672,265 (for carrying pipe and lumber); 2,678,150 (for carrying round bars or tubes); 2,680,544 (for carrying pipe and rods); and 3,877,624 (for carrying ladders and the like).

However, some of these previously described devices are not suitable for carrying ladders, others are not suitable for carrying heavy ladders, and still others do not provide convenient means for retaining ladders on the support or rack on the vehicle.

The present invention provides ladder racks or supports which are intended for relatively permanent installation on a vehicle or other base (e.g. garage walls and the like) and which are quite convenient to use since no separate cords, straps, or clamps are required in order to retain a ladder on the rack.

SUMMARY OF THE INVENTION

In accordance with the present invention there is provided a ladder rack comprising:
 (a) an elongated base member which is adapted to be mounted on a support,
 (b) a first hook member secured to said base member near one end thereof,
 (c) a second hook member carried on the opposite end of said base member, said second hook member including a moveable seat which is normally biased toward said first hook member. In one embodiment the moveable seat is integral with the second hook member, and in another embodiment the seat moves within the second hook member.

The ladder racks of the present invention are quite versatile because they are capable of accommodating various ladder sizes and types. Because of the moveable seat the ladder racks adjust automatically to engage and hold ladders of different widths. Furthermore, the novel ladder racks do not require the use of clamps or tie-downs to hold a ladder in place. Yet, the racks hold a ladder securely and safely. Accordingly, the ladder racks are very easy to use and a ladder can be inserted into the racks quite quickly. The ladder racks are not bulky or unnecessarily heavy, thus enabling the racks to be easily mounted on a variety of substrates (e.g. trucks, garage or warehouse walls, or any substrate on which it is desired to carry or store a ladder). Also, the ladder racks may be mounted vertically, horizontally, or angularly, as desired. For example, the racks may be mounted on the top of a truck, or on the side of a truck, or on a sloping surface.

BRIEF DESCRIPTION OF THE DRAWINGS

The invention is described in more detail hereinafter with reference to the accompanying drawings wherein like reference characters refer to the same parts throughout the several views and in which:

FIG. 8 is a side view of another ladder rack of the invention,
and
FIG. 9 is a side view of a ladder rack of the invention which is pivotably attached to a mounting bracket.

DETAILED DESCRIPTION OF THE INVENTION

Figure 5:
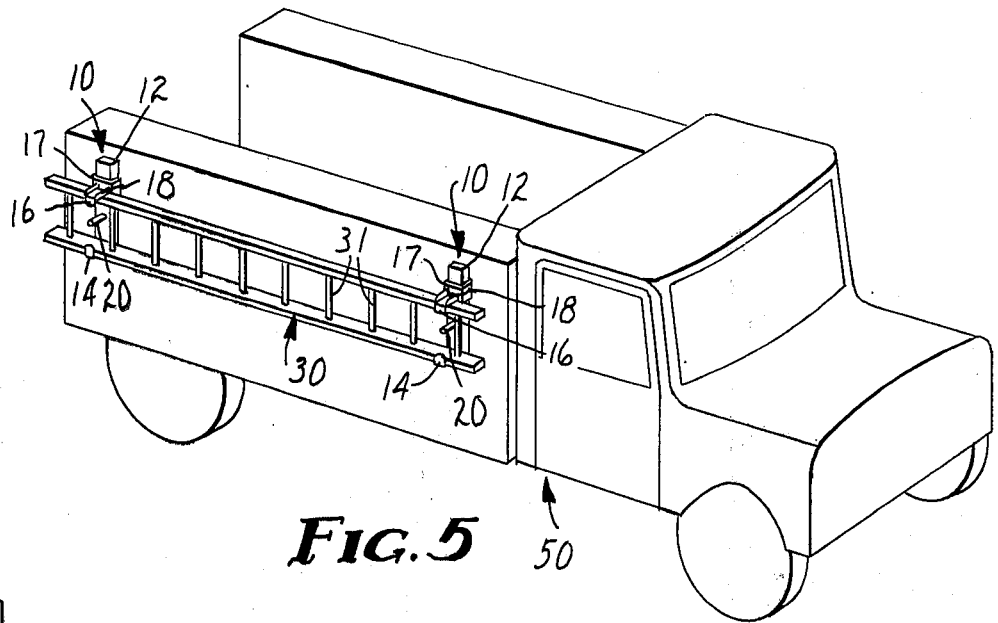
FIG. 5 is a perspective view of a truck carrying two ladder racks of the invention.
Figure 1:
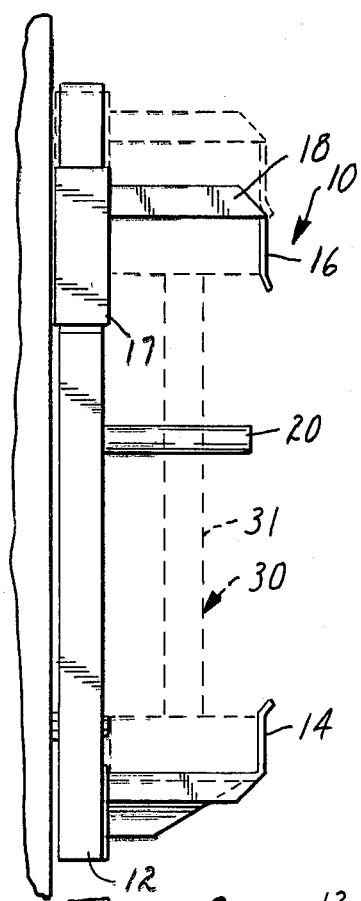
FIG. 1 is a side view of a ladder rack of the invention.
Figure 2:
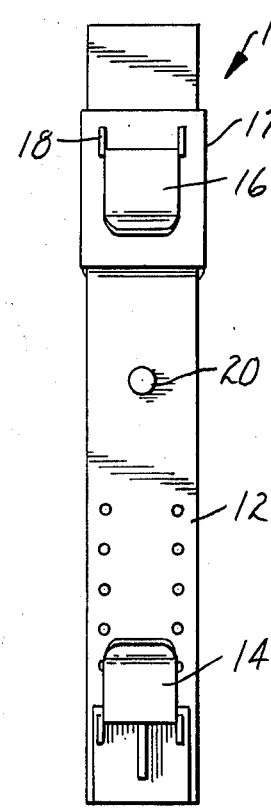
FIG. 2 is a front view of the ladder rack of FIG. 1.
Figure 3:
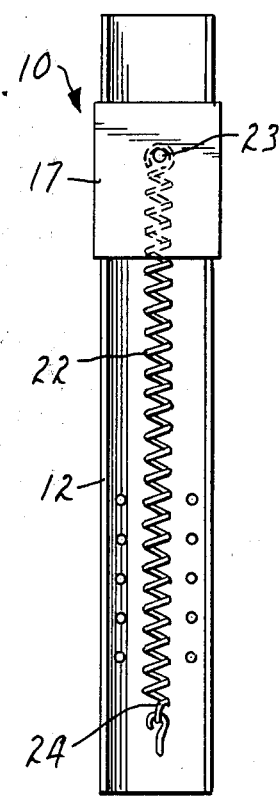
FIG. 3 is a rear view of the ladder rack of FIG. 1.
Figure 4:
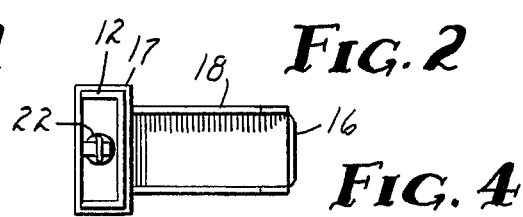
FIG. 4 is a top view of the ladder rack of FIG. 1.

Thus, in FIGS. 1-5 there is shown a ladder rack 10 comprising elongated base 12, first hook member 14, and second hook member 16 which includes seat 18. Peg member 20 is preferably affixed to base 12 and projects outwardly therefrom to prevent rungs 31 of ladder 30 from sliding past.

Hook member 14 is securely affixed to one end of base 12 and is preferably U-shaped. Hook member 16 slidably engages base 12 by means of collar member 17 which encircles base 12. In this embodiment hook member 16 and seat 18 are integral with each other and are adapted to move along base 12. Spring 22 is attached at end 23 to collar member 17 and is attached at end 24 to base 12. Spring 22 accordingly urges hook member 16 toward hook member 14.

In FIG. 5 there are shown two ladder racks of the invention mounted on the side of utility truck 50. The racks are mounted in such a manner that the moveable hook members 16 are located at the top. Thus, ladder 30 is placed into the racks by pushing upwardly against hook members 16 with one side of the ladder in order to permit the other side of the ladder to be raised over hook members 14. The ladder is then nestled between hook members 14 and 16. Spring 22 biases hook member 16 against hook member 14 so that ladder 30 is safely retained therebetween. No separate retention means is required to keep ladder 30 in the racks during transport or storage.

Figure 7:
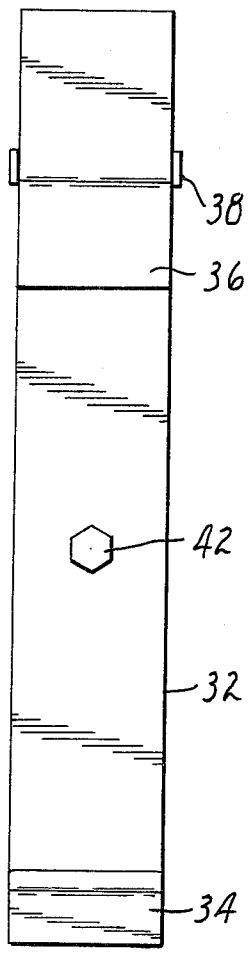
FIG. 7 is a rear view of the ladder rack of FIG. 6.
Figure 6:
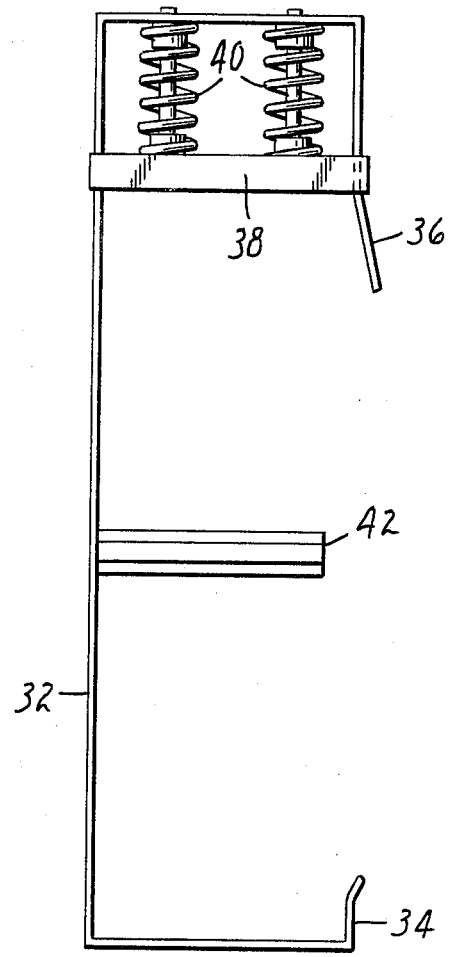
FIG. 6 is a side view of another ladder rack of the invention.

FIGS. 6 and 7 show another embodiment of the ladder racks of this invention wherein hook members 34 and 36 are each securely affixed to base 32. In this embodiment seat 38 is moveable within hook member 36 and is biased toward hook member 34 by means of springs 40. Peg member 42 is fastened to base 32 and projects outwardly between hook members 34 and 36.

FIGS. 8 and 9 show another embodiment of ladder rack within the present invention. Hook member 44 is securely fastened to base 46 near one end. Hook member 48 is slidably engaged on base 46 and is biased toward hook member 44 by means of spring 47. Dotted lines show the extended position of hook member 48. In FIG. 9 the ladder rack of FIG. 8 has been pivotably attached at end 52 to a U-shaped mounting bracket 60 in such a manner that the rack may be pivoted outwardly (as shown by the dotted lines) to permit a ladder to be loaded or unloaded and then pivoted inwardly so that the rack and the ladder are contained within the mounting bracket 60. Locking means comprising eyelet 62 carried by base 46 and latch 64 carried by bracket 60. If desired, a padlock may be used in eyelet 62 in order to prevent theft of the ladder from the rack.

The ladder racks of the invention may be mounted on vehicles for the transport of ladders or they may be mounted on garage or warehouse walls or the like for the storage of ladders. Also, the ladder racks may be mounted at any desired angle, e.g. vertically, horizontally, or inclined.

The ladder racks are typically made of metal for durability purposes, although they could be made from other materials also, depending upon their intended usage.

Other variants of the ladder racks within the scope of the present invention will be apparent to those in the art.

What is claimed is:

1. A ladder rack comprising:
    (a) an elongated based member having end edges which is pivotably attached about an axis parallel to said edge at one end thereof to a mounting bracket,
    (b) a first hook member secured to said base member near one end thereof,
    (c) a second hook member carried on the opposite end of said base member, said second hook member including a moveable seat which is normally biased toward said first hook member.

2. A ladder rack in accordance with claim 1, wherein said first and second hook members are U-shaped.

3. A ladder rack in accordance with claim 2, wherein said first and second hook members face each other.

4. A ladder rack in accordance with claim 1, wherein said second hook member and said moveable seat form an integral unit moveably attached to said base member.

5. A ladder rack in accordance with claim 1, wherein said second hook member is secured to said base member, and wherein said moveable seat is moveable within said second hook member.

6. A ladder rack in accordance with claim 1, wherein said moveable seat is biased towards said first hook member by means of a spring.

7. A ladder rack in accordance with claim 1, wherein a peg member is affixed to said base member between said first and second hook members.

8. A ladder rack in accordance with claim 1, wherein said mounting bracket is u-shaped.

* * * * *